United States Patent
Kamvar et al.

(10) Patent No.: US 8,393,002 B1
(45) Date of Patent: Mar. 5, 2013

(54) METHOD AND SYSTEM FOR TESTING AN ENTITY

(75) Inventors: Maryam Kamvar, San Francisco, CA (US); Shumeet Baluja, Leesburg, VA (US)

(73) Assignee: Google Inc., Mountain View, CA (US)

( * ) Notice: Subject to any disclaimer, the term of this patent is extended or adjusted under 35 U.S.C. 154(b) by 1110 days.

(21) Appl. No.: 12/148,650

(22) Filed: Apr. 21, 2008

(51) Int. Cl.
*G06F 21/00* (2006.01)

(52) U.S. Cl. .............. 726/26; 713/182; 726/2; 382/182; 382/229; 707/706

(58) Field of Classification Search .................. 713/182; 726/2–4, 26; 380/181–182, 229–231; 707/706–707
See application file for complete search history.

(56) References Cited

U.S. PATENT DOCUMENTS

| | | | | |
|---|---|---|---|---|
| 7,646,921 | B2 * | 1/2010 | Vincent et al. | 382/225 |
| 7,891,005 | B1 * | 2/2011 | Baluja et al. | 726/26 |
| 7,917,508 | B1 * | 3/2011 | Baluja et al. | 707/736 |
| 2005/0065802 | A1 * | 3/2005 | Rui et al. | 705/1 |
| 2007/0026372 | A1 * | 2/2007 | Huelsbergen | 434/322 |
| 2007/0100890 | A1 * | 5/2007 | Kim | 707/104.1 |
| 2008/0066014 | A1 * | 3/2008 | Misra | 715/846 |
| 2008/0216163 | A1 * | 9/2008 | Pratte et al. | 726/7 |

OTHER PUBLICATIONS

Monica Chew and J.D. Tygar; In Proceedings of the 7th International Information Security Conference (ISC 2004), Springer, Sep. 2004, pp. 268-279.
Luis von Ahn, Manuel Blum, and John Langford, "Telling Humans and Computers Apart Automatically", Communications of the ACM, Feb. 2004, vol. 47, No. 2, pp. 57-60.
Kumar Chellapilla, Kevin Larson, Patrice Simard, Mary Czerwinski, Computers Beat Humans At Single Character Recognition in Reading Based Human Interaction Proofs (HIPs).
Greg Mori, Jitendra Malik, "Recognizing Objects in Adversarial Clutter: Breaking a Visual CAPTCHA" Proceedings of the 2003 IEEE Computer Society Conference on Computer Vision and Pattern Recognition.
Gabriel Moy, Nathan Jones, Curt Harkless, and Randall Potter, "Distortion Estimation Techniques in Solving Visual CAPTCHAs" Proceedings of the 2004 IEEE Computer Society Conference on Computer Vision and Pattern Recognition.
The Captcha Project, downloaded Feb. 21, 2008, http://www.captcha.net/cgi-bin/gimpy.
Baluja, et. al., U.S. Appl. No. 11/502,993, filed Aug. 10, 2006.

* cited by examiner

*Primary Examiner* — Hadi Armouche
(74) *Attorney, Agent, or Firm* — Lerner, David, Littenberg, Krumholz & Mentlik, LLP

(57) ABSTRACT

A system and method is provided wherein, in one aspect, a number of different elements are presented to a user. The user is instructed to pick the elements that are the most related to one another. If the user selects the two most related elements, the user is presented with access to additional information, such as a screen for creating an email account. The system and method are intended to allow access to information by humans, but not remote computers emulating a human.

12 Claims, 9 Drawing Sheets

METHOD AND SYSTEM FOR TESTING AN ENTITY

BACKGROUND OF THE INVENTION

Human interaction proofs ("HIPs"), also known as CAPTCHAS, are used to ensure that a human, and not an automated computer process such as an automated computer script or bot, can access particular pages of a website. The HIP is a challenge designed to be easily solved by humans, yet too difficult for all but the most sophisticated computers to solve. HIPs have become commonplace on Internet websites to protect, for example, free online services, online polls, free mail services, etc., from abuse or unfair access by computers.

Existing HIPs often display text intentionally degraded using noise, overlays, shearing, etc., and the challenge is for a human to read the text. With advances in automated software processing, however, computers are increasingly proficient in deciphering the degraded text and, thus, solve such HIPs.

Therefore, there exists a need for a challenge, which may be used to control access to information, and which is easily solved by humans but difficult for most computers to solve.

SUMMARY OF THE INVENTION

The present invention is intended to address the foregoing needs.

One aspect of the invention involves a method of providing information. The method includes selecting first, second and third images, wherein the first and second image are selected so as to be more related to each other than to the third image. An identification of two of the images is received from an entity, such as a client computer. Information is provided to the entity based on whether the two identified images are the first and second images.

Another aspect of the invention involves a method of providing restricted information including: receiving a request for restricted information from a user; providing at least three elements to be rendered to the user wherein, in response to the request, at least two of the elements were determined to be related and the other element or elements were determined to be unrelated to the related elements; receiving, from the user, at least two elements selected by the user; providing the restricted information if the user's selected elements are the two elements that were determined to be related; and providing other information if at least one of the user's selected elements is an element that was determined to be unrelated.

The element may be an image, audio (such as a song) or a word to be displayed.

Yet another aspect of the invention provides a method of controlling access. It includes: selecting a first search query from a plurality of search queries based on the frequency with which search queries were used for searching; selecting first and second proof elements based on the first search query; selecting a second search query from the plurality of search queries based on the first search query; selecting a third proof element based on second search query; providing the first, second and third proof elements for identification of two of the elements; and providing access based on the two identified elements.

A further aspect of the invention provides a method of obtaining access to information. In this aspect, the method comprises: providing a request for restricted information from a user; receiving and rendering three images in response to the request, wherein at least two of the images are more related to each other than the other image; providing an identification of the two images; receiving the restricted information if the identified elements are the two elements that are more related. For example, the images may be rendered by a web browser on a client computer.

Still another aspect of the invention is a system of providing information. The system includes a processor and a memory containing instructions for execution by the processor. The instructions include: selecting first, second and third images, wherein the first and second image are selected so as to be more related to each other than to the third image; receiving, from an entity, an identification of two of the images; and providing information to the entity based on whether the two identified images are the first and second images.

BRIEF DESCRIPTION OF THE DRAWINGS

Other objects and advantages of the present invention will be apparent from the following detailed description of the present preferred embodiments, which description should be considered in conjunction with the accompanying drawings in which like reference indicate similar elements and in which.

DETAILED DESCRIPTION OF INVENTION

Figure 3:
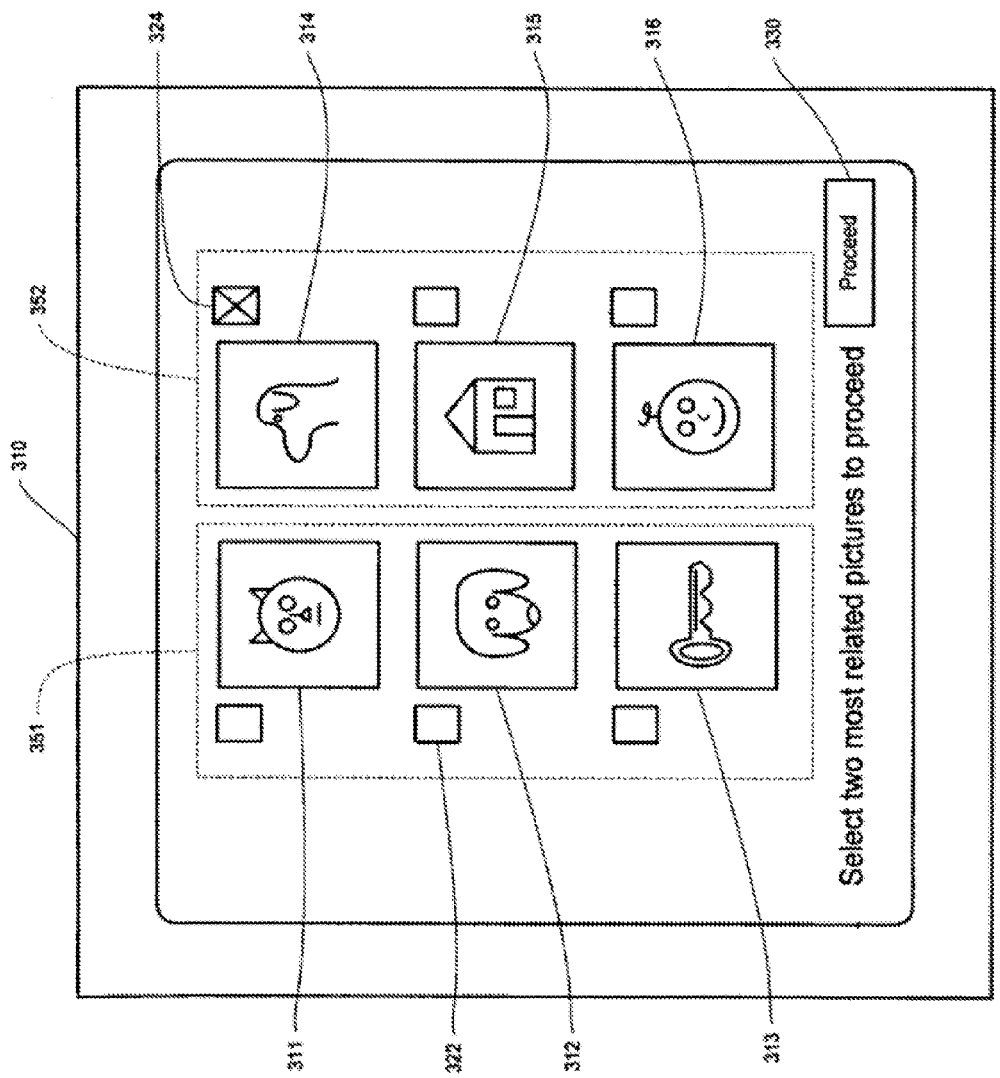
FIG. 3 is a diagram of a screen in accordance with an aspect of the invention.

In at least some aspects, the invention provides a system and method of restricting access to information. For example, as shown in FIG. 3, a number of different images may be presented to a user such that the user needs to pick the two images that are the most related to one another. If the user selects the two most related images, the user is presented with access to additional information, such as a screen for creating an email account. The system and method are intended to allow access to the information by humans, and prevent computers (that may be emulating a human) from obtaining access.

Figure 1:
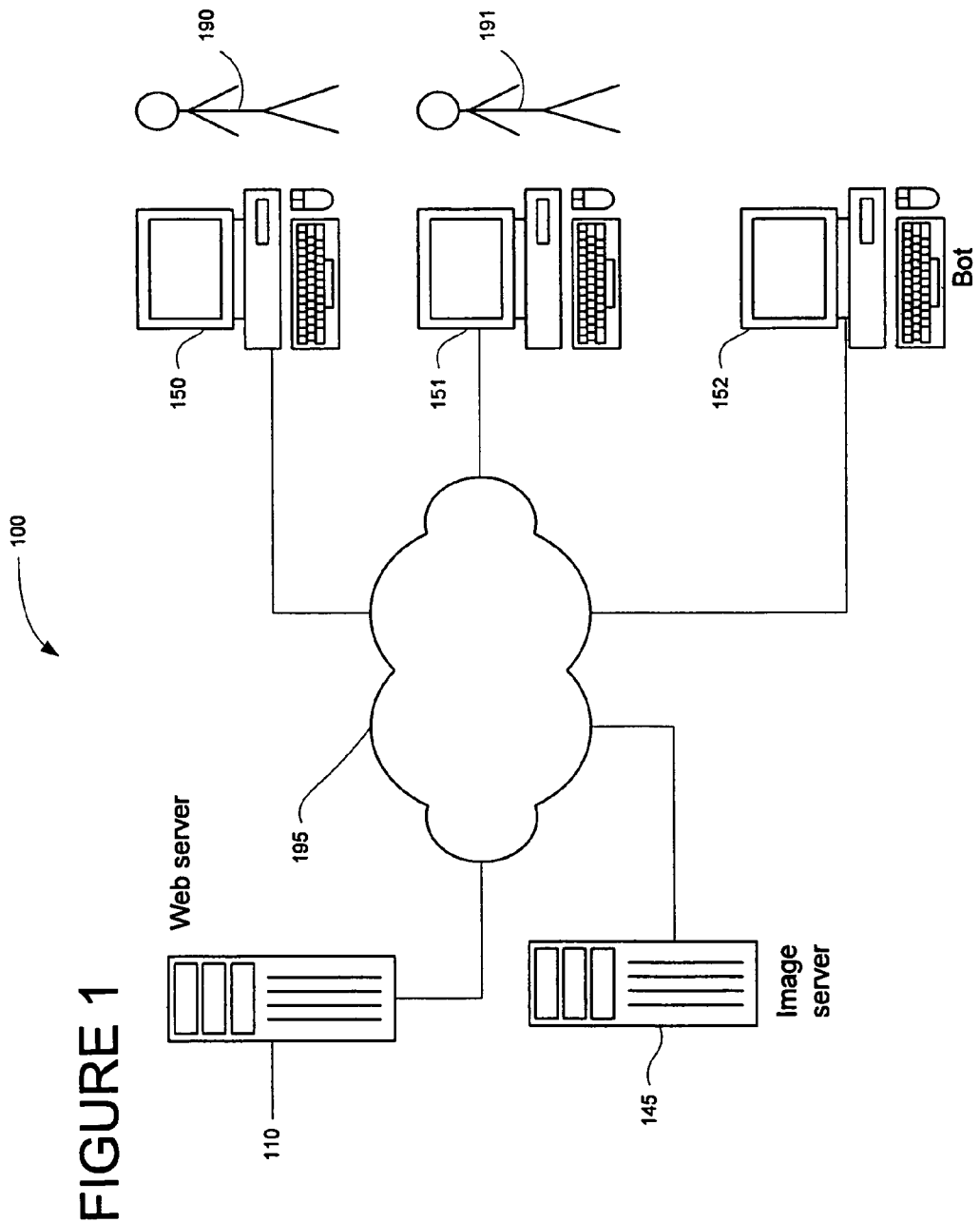
FIG. 1 is a diagram of a system in accordance with an aspect of the invention.
Figure 2:
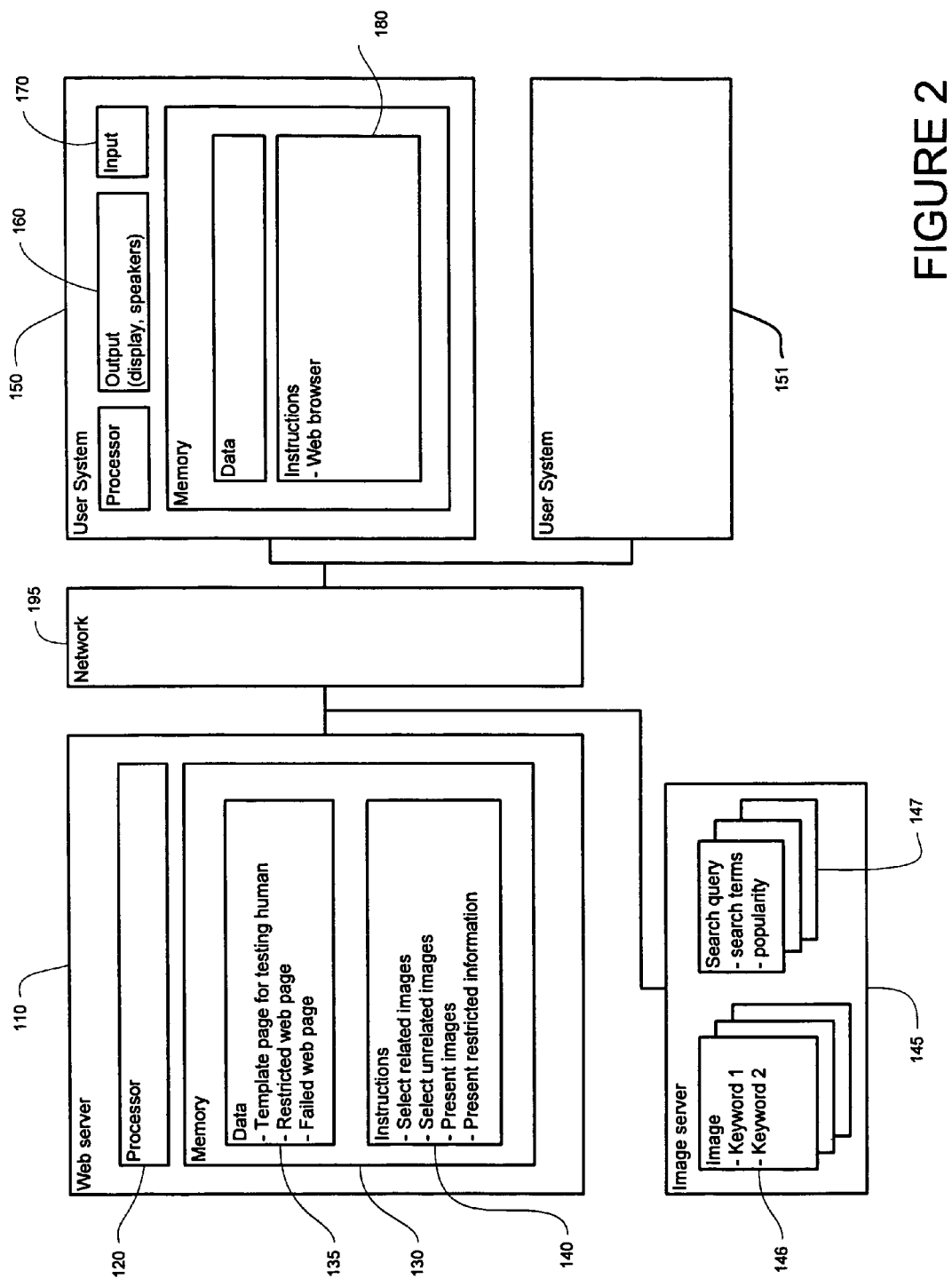
FIG. 2 is a diagram of a system in accordance with an aspect of the invention.

As shown in FIGS. 1 and 2, a system 100 in accordance with one aspect of invention comprises computers in communication with one another, such as over a network.

For example, and as shown in FIG. 2 in particular, system 100 may include a server 110 containing a processor 120, memory 130 and other components typically present in a computer.

Memory 130 stores information accessible by processor 120, including instructions 140 that may be executed by the processor 120 and data 135 that may be retrieved, manipulated or stored by the processor. The memory may be of any type capable of storing information accessible by the processor, such as a hard-drive, ROM, RAM, CD-ROM, write-capable or read-only memories.

The processor 120 may comprise any number of well known processors, such as processors from INTEL™ Corporation. Alternatively, the processor may be a dedicated controller for executing operations, such as an ASIC.

The instructions 140 may comprise any set of instructions to be executed directly (such as machine code) or indirectly (such as scripts) by the processor. In that regard, the terms "instructions," "steps" and "programs" may be used interchangeably herein. In that regard, the instructions also function as an algorithm allowing the processor to perform the purposes intended by the instructions. The instructions may be stored in object code form for direct processing by the processor, or in any other computer language including scripts or collections of independent source code modules that are interpreted on demand or compiled in advance. The functions, methods and routines of instructions in accordance with the present invention are explained in more detail below.

Data 135 may be retrieved, stored or modified by processor 120 in accordance with the instructions 140. The data may be stored as a collection of data. For instance, although the invention is not limited by any particular data structure, the data may be stored in computer registers, in a relational database as a table having a plurality of different fields and records, XML documents, or flat files. The data may also be formatted in any computer readable format such as, but not limited to, binary values, ASCII or EBCDIC (Extended Binary-Coded Decimal Interchange Code). Similarly, the data may include images stored in a variety of formats such as vector-based images or bitmap images using lossless (e.g., BMP) or lossy (e.g., JPEG) encoding. Moreover, the data may include any information sufficient to identify the relevant information, such as descriptive text, proprietary codes, pointers, references to data stored in other memories (including other network locations) or information which is used by a function to calculate the relevant data.

Although the processor 120 and memory 130 are functionally illustrated in FIG. 2 as being within the same block, it will be understood that the processor and memory may actually comprise multiple processors and memories that may or may not be stored within the same physical housing or location. For example, some or all of the instructions and data may be stored on a removable CD-ROM and others within a read-only computer chip. Some or all of the instructions and data may be stored in a location physically remote from, yet still accessible by, the processor. Similarly, the processor may actually comprise a collection of processors which may or may not operate in parallel.

In one aspect, server 110 communicates with one or more client computers 150-52. Each client computer may be configured similarly to the server 110, with a processor, memory and instructions, as well as a user input device 170 and a user output device, such as display 160. Each client computer may be a general purpose computer, intended for use by a person 190-91 (FIG. 1), having all the internal components normally found in a personal computer such as a central processing unit (CPU), display 160, CD-ROM, hard-drive, mouse, keyboard, touch-sensitive screen, speakers, microphone, modem and/or router (telephone, cable or otherwise) and all of the components used for connecting these elements to one another.

However, it will be noted from FIG. 1 that one of the client computers 152 is not operated by a human such as user 190-191. Rather, the client computer 152 may comprise an Internet bot designed to navigate web sites in a manner which appears to emulate a user. For example, client computer 152 may actually be a server programmed to create free email accounts for the purpose of denying accounts to legitimate users, reselling the email account or other illegitimate purposes.

The server 110 and client computers 150-52 are capable of direct and indirect communication with other computers, such as over a network 195. Although only a few computers are depicted in FIG. 1, it should be appreciated that a typical system can include a large number of connected servers and clients, with each different computer being at a different node of the network. The network 195, and intervening nodes, may comprise various configurations and protocols including the Internet, intranets, virtual private networks, wide area networks, local networks, private networks using communication protocols proprietary to one or more companies, Ethernet, WiFi and HTTP. The communication may be facilitated by any device capable of transmitting data to and from other computers, such as modems (e.g., dial-up or cable), network interfaces and wireless interfaces. Server 110 may be a web server. Although certain advantages are obtained when information is transmitted or received as noted above, other aspects of the invention are not limited to any particular manner of transmission of information. For example, in some aspects, the information may be sent via a medium such as a disk, tape, CD-ROM, or directly between two computer systems via a dial-up modem. In other aspects, the information may be transmitted in a non-electronic format and manually entered into the system.

Moreover, computers in accordance with the systems and methods described herein may comprise any device capable of processing instructions and transmitting data to and from humans and other computers, including network computers lacking local storage capability, PDA's with modems and Internet-capable wireless phones.

Server 145 may function as a repository of image data. For example, the server may comprise an image server 145 storing many images or the locations of images. The images may be obtained from a search of the network to which the server is connected, such as by searching web sites; thus, as images are added to or removed form the network, they may be added to or removed from the collection of images maintained by the image server 145. For example, the image server may be the servers providing the GOOGLE IMAGES™ service. Alternatively, the image data may comprise a collection of proprietary images.

Images stored in image server 145 are preferably retrievable based on a search. For example, if a few of the images are associated with dogs, each such image may be associated with the keyword "dog". Each image may also be associated with many keywords. For example, if the image comprised a Dalmatian standing in front of a firehouse, the image may be associated with the text words "dog," "Dalmatian," and "firehouse." Accordingly, a search for images containing the terms "dogs" and "firehouses" would turn up one or more images associated with dogs and firehouses.

In one aspect, the image server 145 is accessible not only by systems intended to determine whether a client computer is being operated by a human, but also by other computers to search for images. For example, image server 145 may comprise a web server with images open to the public, whereby the images are retrieved by the user's entry of search queries.

The image server 145 may also store past search requests. Thus, when a user searches the image server 145, the search is stored as a query 147. The server may also store how popular a query is. For example, the image server 145 may track not only how many times it has received a request for images associated with the term "dog," but also store how many times the term has ever been requested in the past or requested within a recent period of time.

As explained below, the stored search queries 147 may themselves be searched to determine how often two search terms appear in the same query.

Figure 7:
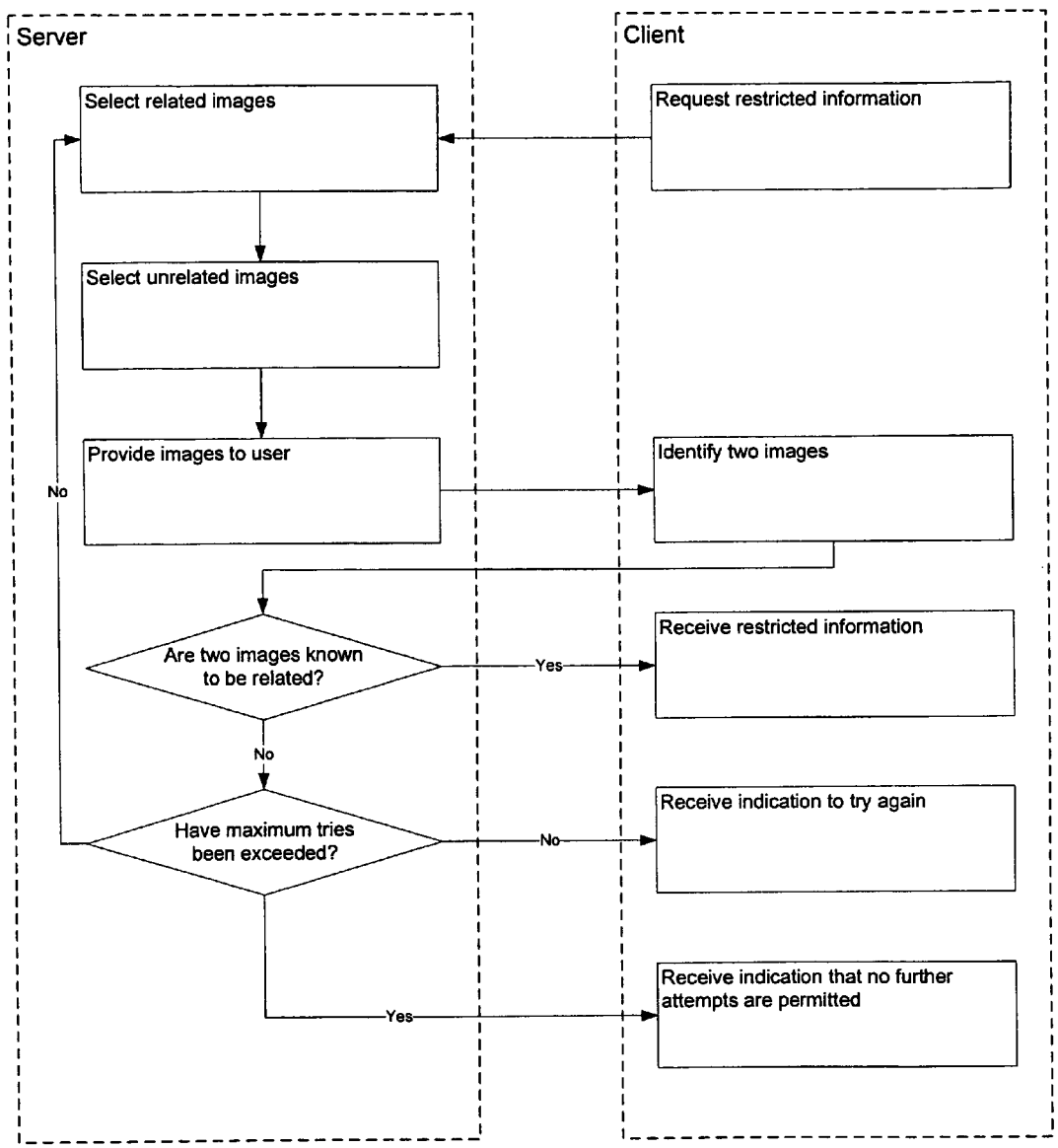
FIG. 7 is a flowchart illustrating a method of providing access to restricted information in accordance with an aspect of the invention.
Figure 8:
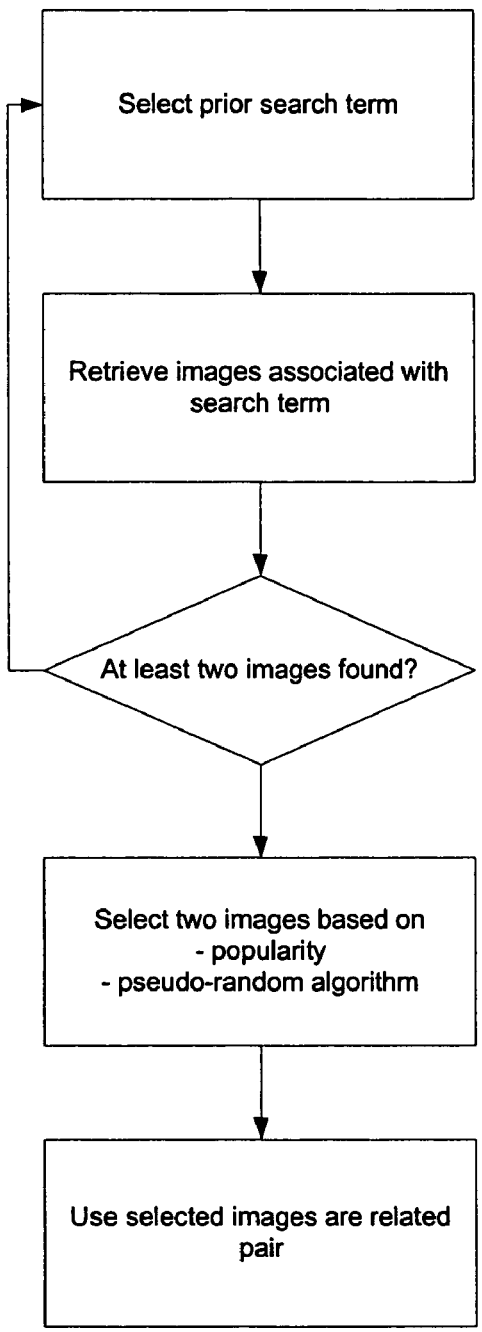
FIG. 8 is a flowchart illustrating a method of providing access to restricted information in accordance with an aspect of the invention.
Figure 9:
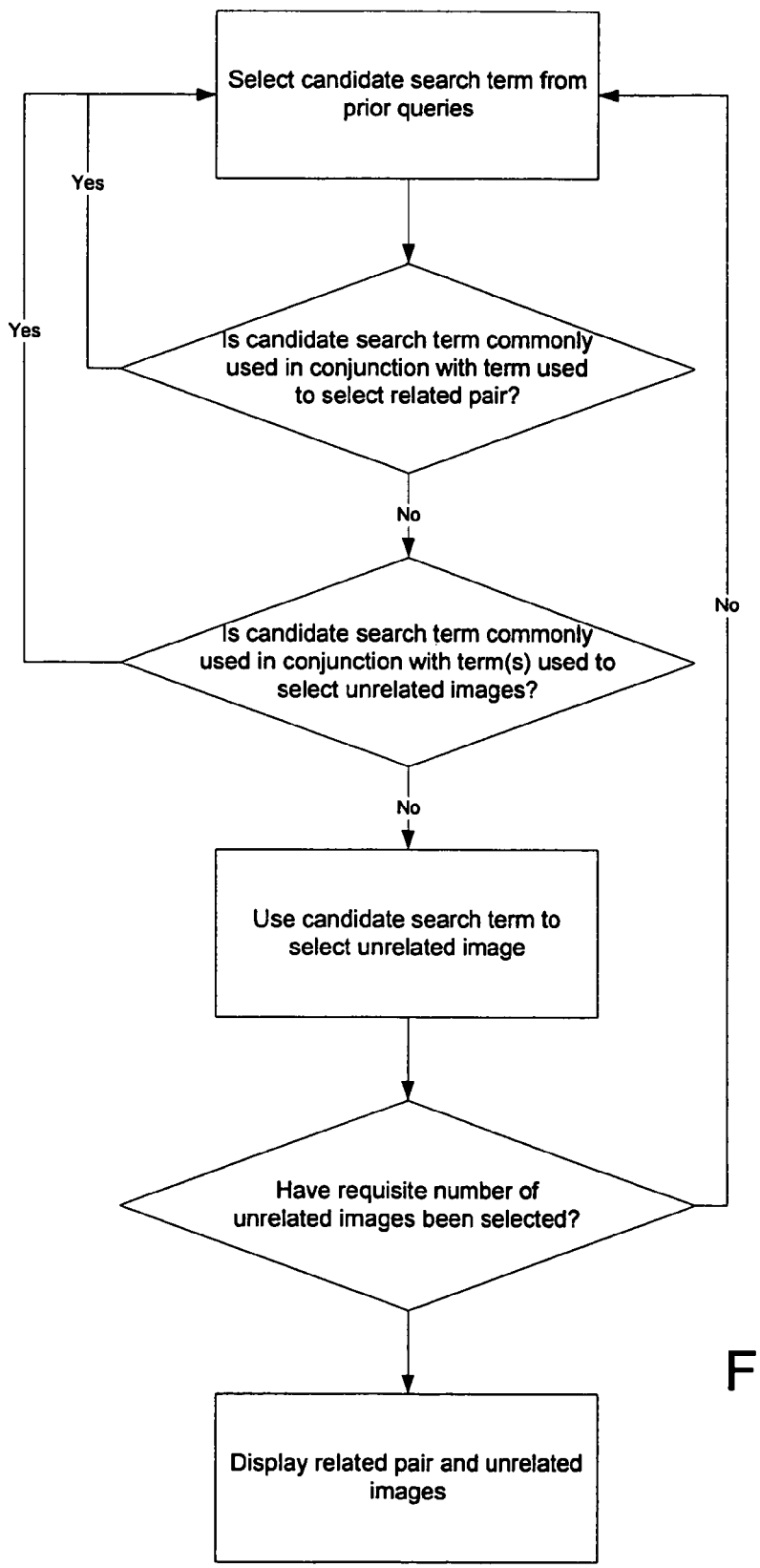
FIG. 9 is a flowchart illustrating a method of providing access to restricted information in accordance with an aspect of the invention.

In addition to the operations illustrated in FIGS. 7-9, an operation in accordance with a variety of aspects of the method will now be described. It should be understood that the following operations do not have to be performed in the precise order described below. Rather, various steps can be handled in reverse order or simultaneously.

The process may begin by a user at a client computer requesting information from web server 110. By way of example, the user may ask to create a new email account. In one aspect of the system, the web server seeks to allow humans to create new email accounts, but also seeks to prevent computers from automatically creating email accounts (thus denying legitimate individuals an opportunity to fully use the system).

In response to the request for additional information, the system provides the user with at least three images, wherein the user must select the two images that are the most related. For example, FIG. 3 is a screen shot of one possible implementation of the system. Six images 311-316 (a cat, dog, key, dog, house and baby, respectively) are transmitted to the user and shown on the user's display 310. In this example, images 312 and 314 are strongly related because both images show a dog. The user may select the image by checking boxes 322 and 324, respectively, and clicking the proceed button 330. Any other manner of identifying the images may also be used, such as by simply clicking the two images.

In one aspect, and as shown in FIG. 3, the images permitting access to more information are not identical, but are related. By way of example only, one of the images 312 may be a picture of one type of dog and the other image 314 a completely different type of dog. However, the images may be selected by the system so that they are more likely to be related to one another, as far as most people would agree, than the other images. For example, it is expected that most people would consider the dog image 312 on the left 351 to be more related to the dog image 314 on the right 352 than the house image 315 or baby image 316. That is because the dog images 312, 314 share a common component, e.g., both show a dog. Although other images may be related (e.g., a key unlocks a house), they are not as related.

Figure 4:
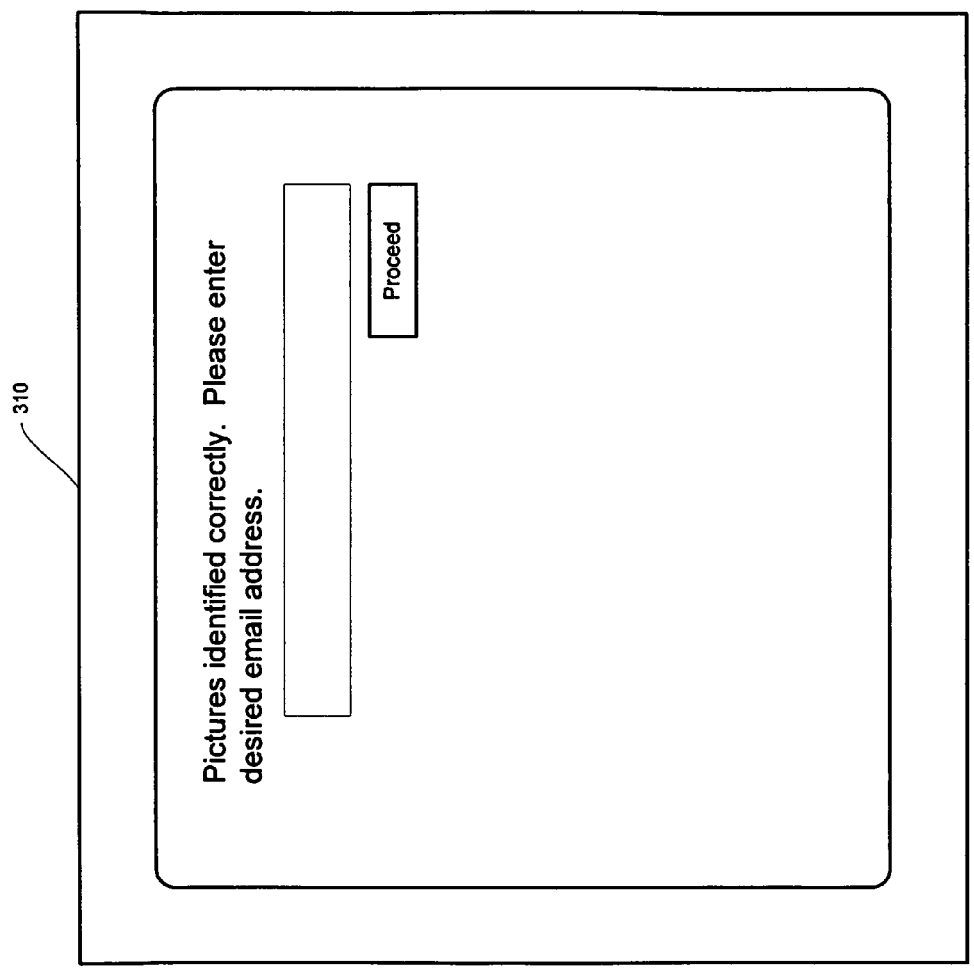
FIG. 4 is a diagram of a screen in accordance with an aspect of the invention.

The server checks the user's response and, if the user has selected the images correctly, the user may be presented with access to the previously-restricted information. For example as shown in the screen shot of FIG. 4 and as requested by the user, the user may be allowed to request a new email address.

Figure 5:
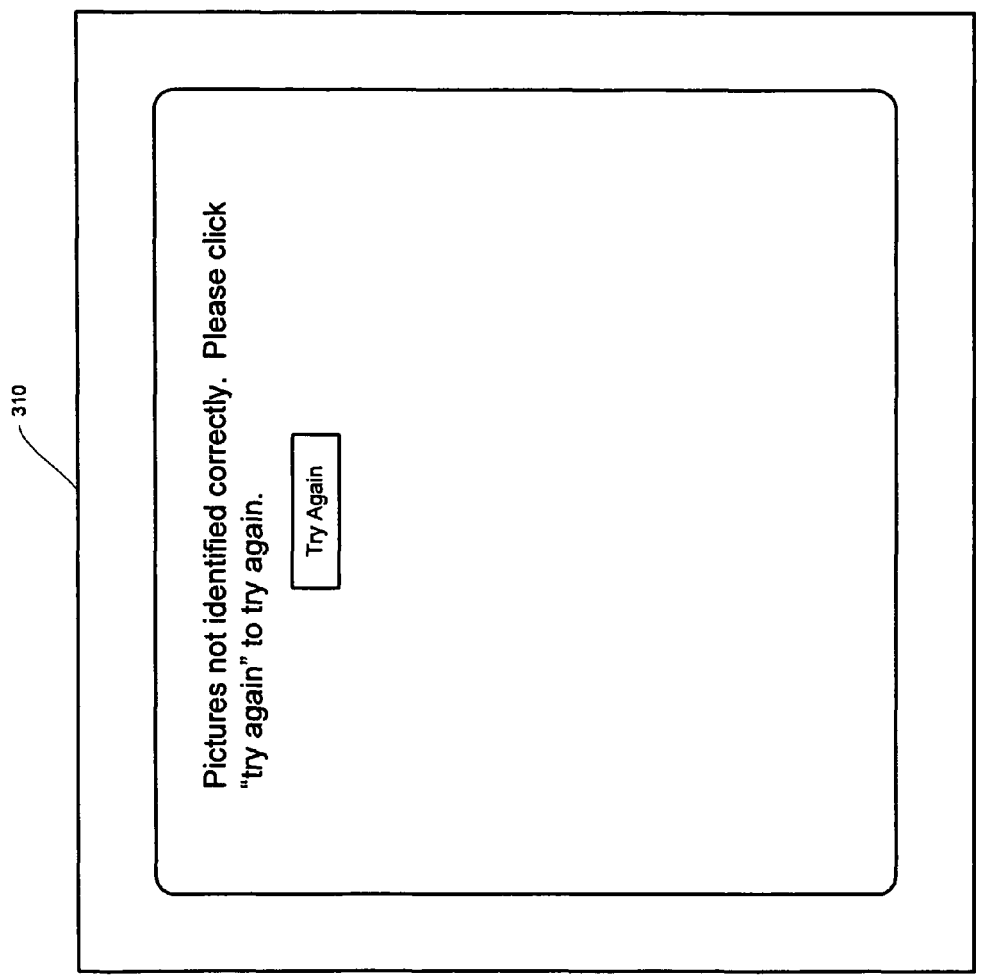
FIG. 5 is a diagram of a screen in accordance with an aspect of the invention.

If the user's response is not correct, the user may be informed of the fact (as shown in the screen shot of FIG. 5). In one aspect, the user is allowed to try again with the same or new images. For example, six new images may be selected, two of which are intended to be more related than the other four, and the new images are shown in a manner similar to that described in connection with the FIG. 3.

Figure 6:
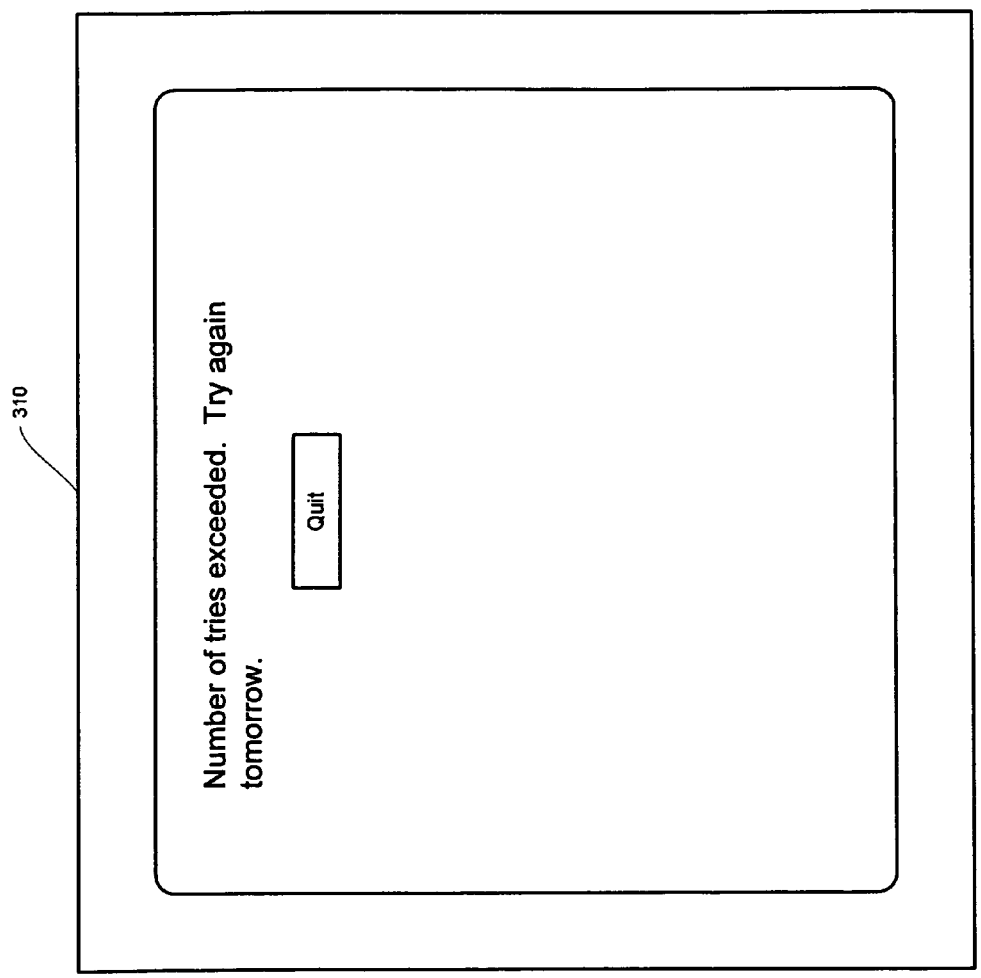
FIG. 6 is a diagram of a screen in accordance with an aspect of the invention.

If the user failed too many times in its attempt to identify the most-related images, the user may be prevented from trying again until the passing of some defined duration of time, as shown by example in the screen shot of FIG. 6. As most computers presently do not have the capability to determine which of a plurality of images are more related to each other than other images in the manner described above, it is expected that repeated failures indicate that the images are being identified by a computer such as bot 152 shown in FIG. 1. Accordingly, by denying access based on a failure to identify the related images, the system and method are intended to limit access to the requested information substantially only to humans.

As shown in FIG. 3, the images may be placed in different groups such that each image of the desired pair is in a separate group. For example, the user may be prompted to select one image from the left (represented by group 351) and one from the right (represented by group 352).

One possible system and method for selecting the images will now be described. As shown in the flowchart of FIG. 8 and separately described herein, server 110 selects a prior query 147 stored by image server 145. The query may be selected based on popularity (e.g., only the 1,000 most popular image queries are selected), random selection (e.g., using a pseudo-random algorithm to randomly select one of the popular queries), the presence of a single term within the query (e.g., only queries such as "dog" instead of "dog and firehouse"), or other criteria (e.g., queries yielding relatively few images are not selected), either alone or in combination.

The selected prior query is then used to retrieve the two images that are intended to be most related of the images shown to the user (for ease of reference, these two images may be referred to herein as the "related pair"). If more than two images are found, two of the images are selected as the related pair based on criteria, such as popularity (e.g., images are not selected by the system if users have rarely viewed the image in response to it being returned form a search query), random selection (e.g., two of the returned images are randomly selected), or other criteria, either alone or in combination.

The system also selects the images that are intended to be unrelated to, or at least less related, than the related pair (for ease of reference, these other images may be referred to herein as "unrelated images"). One possible method of selecting the unrelated images is shown in FIG. 9. The system queries the prior search terms for popular searches that do not mention the search term used to select the related pair. For example, if the prior search term was "dog," the system may select popular search queries that rarely, if ever, are combined with the term "dog." Thus, if an analysis of prior search queries 147 reveals that it was common for users to search for images including both a "dog" and a "leash," but users rarely search for images relating to both a "dog" and a "key," then the term "leash" would not be selected to pick an unrelated image but the term "key" would.

The process may be repeated with respect to the other unrelated images. For example, a candidate search term is selected, and it is then determined whether the candidate search term is commonly used in conjunction with the search term used to the select the related pair. If not, it may also be determined whether the candidate search term is commonly used in conjunction with the search term(s) used to the select the unrelated images. For example, in one aspect of the invention, it is preferable to have only one related pair among the images displayed to the user rather than having two or more related pairs.

The images may be selected in response to the request from the user. In other words, rather than creating a pre-selected collection of related and unrelated images, the related images and the unrelated images may be selected in response to receiving a request from the user for the restricted information.

After the images are selected, they may be presented to the user in any number of ways. For example, as shown in FIGS. 2 and 3, web server 110 may store a template web page that contains text instructions to the user, a button 330 indicating that the user has made his selection, as well as placeholders for the images. In response to the user's request for the restricted information, the server 110 selects the images, creates a web page based on both the template and selected images, and transmits the resultant page to the user.

If the image server 145 does not store the images themselves but rather references to the images (such as the address of the web page storing the image and the location of the image on the page), then web server 110 may obtain the images from the site and insert them into the pages. Alternatively, the web server may insert references to images, wherein the user system's browser obtains and renders the image upon receiving the web page from the web server 110.

One of the advantages of the present invention is its ability to accommodate a wide variety of alternatives to the example structural elements and operations discussed above.

For example, although the source of images 145 may be any source, such as a folder containing a limited number of image files or an entire server farm of web servers, the use of an image store which is continuously updated provides particular advantages. For CAPTCHAS relying on graphics, it is preferable to select from a large number of graphics in order to minimize the likelihood that a bot can identify most images based on trial and error. Accordingly, in one aspect, the image server 145 contains images that are obtained and updated based on information obtained from a public network (such as by allowing users to submit images over the Internet or by obtaining images placed on the Internet for public access). The search parameters associated with the images may be similarly obtained from a public network (such as by allowing users to select the keywords or by associating the images with text surrounding an image on a web page). The image server may further be continuously and periodically updated. Accordingly, as images are added to the public network, the number of images that may be used in accordance with the system and method described herein increases as well.

Different systems and methods for selecting the images to be displayed from the source are also contemplated. For example, the web server 110 may compile a list of the keywords associated with the images, and randomly select one of the keywords. Of the images 146 associated with that keyword, two are randomly selected for presentation to the user. The remaining images are selected by randomly selecting a keyword, and then randomly selecting a single image associated with that keyword.

In another aspect of the invention, users' success in indentifying the related pair is tracked and stored. This information may be used, among other things, to increase or decrease the likelihood of an image within the pair being selected for presentation to other users.

Neither the system nor method are limited to any particular number or arrangement of images to be presented, or selected, by the user. For example, rather than putting one of the related images on the left and another on the right, the related pair may be randomly distributed among all of the unrelated images. A user may also be required to pick more than two related images. For example, the user may be required to pick three related images among a total of four or more images. Multiple sets of related images may be presented to the user, in which case the user must identify one or more of the pairs. Preferably, a sufficient number of related images and unrelated images are presented to the user such that most humans, but few computers, can identify the related images.

The method and system may also be used in connection with videos. For example, the user may be required to select two related videos among three or more videos. Audio recordings, such as songs or the like, may also be used for presentation to the user (such as by clicking buttons which allow the songs to be played to the user over the user system's speakers). Though more likely to solved by a computer, an alternative aspect of the system displays related words (e.g., "dog" and "puppy") among other unrelated words (e.g., "key"). Combinations of related and unrelated images, video, audio and words may also be used.

In one aspect of the invention, the same search term is not used to select the related pair. Rather, two terms which are known to be related may be used such as "dog" and "puppy." Search terms may be determined to be related to one another based on pre-established criteria, such as a person at the web server manually creating relationships between search terms. Search terms may also be determined to be related to one another based on an analysis of the prior search queries, such as by assuming that search terms that frequently appear in the same query are related.

In another aspect, web server 110 may perform challenges on behalf of other servers. In connection with such an aspect of other aspects, server 110 may transmit a success or failure signal based on whether the related pair was found or not, and where the success or failure signal indicates whether the challenge has been solved.

Accordingly, one embodiment of the system and method allows the selection of at least a first, second and third image in order to challenge a requester of information. The images are selected based on past behavior of humans, namely, search queries humans used to search for images. The first and second images are selected based on the same or related search queries, because it is expected that the first and second images, when selected in this manner, would have a commonality or connection, such that a human would readily recognize there is a relationship between the first and second images. The selection of the other search query, by excluding search queries used in a same search session with the first search query, provides that a third image, which is returned from a search with the other search query, does not have a commonality or connection with the first and second images. Consequently, the selection of images for the challenge is performed so that a human would consider that, when the first, second and the third image are presented together in a challenge, the first and second images are related more to each other than to the third image and, therefore, identify the first and second images as the related images.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of providing restricted information comprising:

receiving a request for restricted information from a user;

providing at least three elements to be rendered to the user wherein, in response to the request, at least two of the elements were determined to be related and the other element or elements were determined to be unrelated to the related elements;

receiving, from the user, a selection of at least two of the elements;

providing the restricted information if the user's selected elements are the two elements that were determined to be related; and providing other information if at least one of the user's selected elements is an element that was determined to be unrelated;

wherein success of the user in selecting the at least two related elements is used to increase a likelihood of at least one of the related elements being used again when providing related and unrelated elements to other users in subsequent requests for restricted information.

2. The method of claim 1 wherein the element is an image.

3. The method of claim 1 wherein at least one element is audio.

4. The method of claim 1 wherein at least one element is a song.

5. The method of claim 1 wherein at least one element is a word to be displayed.

6. The method of claim 5 wherein the at least one element is a graphic depicting a degraded word.

7. A method for controlling access comprising:

selecting a first search query from a plurality of search queries based on the frequency with which search queries were used for searching;

selecting first and second proof elements based on the first search query;

selecting a second search query from the plurality of search queries based on the first search query;

selecting a third proof element based on the second search query;

providing the first, second and third proof elements for identification of two of the elements; and providing access based on the two identified elements;

wherein success in selecting the two identified elements is used to increase a likelihood of at least one of the two identified elements being used again when selecting proof elements in response to subsequent requests for access.

8. The method of claim 7 wherein the elements are selected randomly.

9. The method of claim 7 wherein the queries are selected randomly.

10. The method of claim 7 wherein the elements and queries are selected randomly.

11. The method of claim 7 wherein the second search query is selected by determining the frequency with which the terms of the second search query have been used in combination with the terms of the first search query to perform a search.

12. The method of claim 7 wherein the second search query is selected by determining that the second search query has no connection with the first search query.

* * * * *